May 24, 1932.    F. KLAPPERSTÜCK    1,859,741
POURING AND CLOSING LID FOR MILK TINS
Filed Jan. 3, 1930
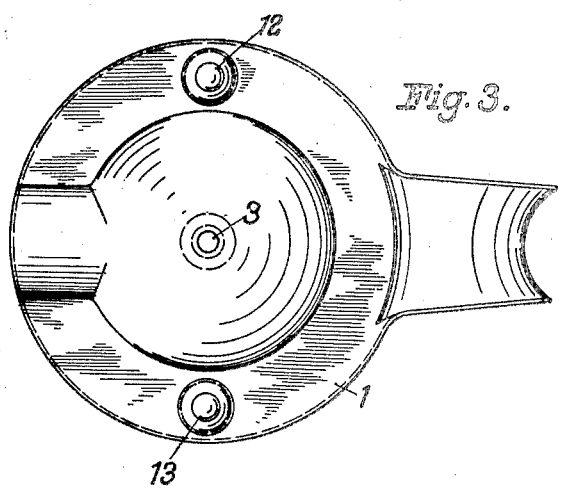
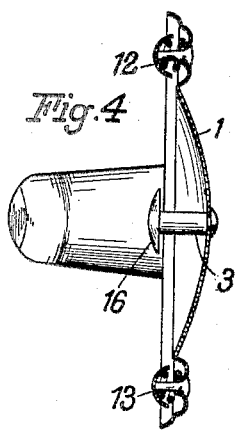
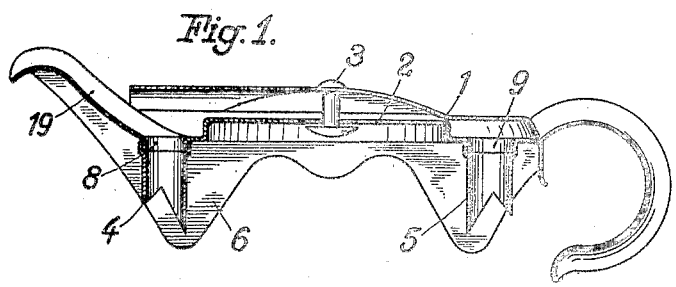
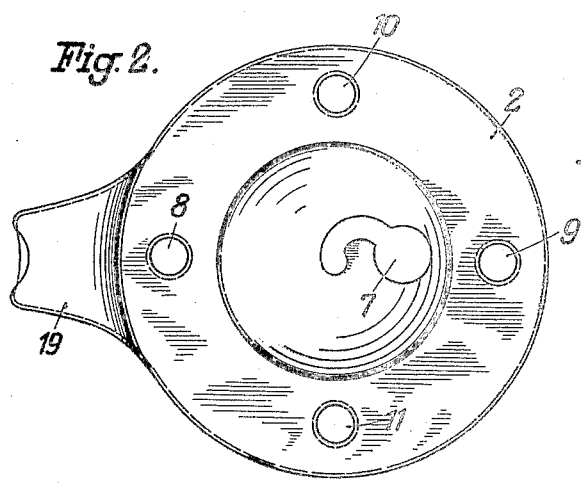
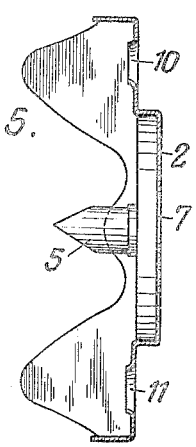
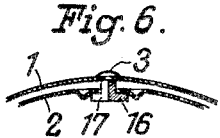
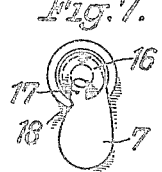
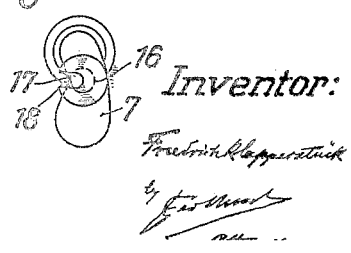
Inventor:
Friedrich Klapperstück Patented May 24, 1932

1,859,741

UNITED STATES PATENT OFFICE

FRIEDRICH KLAPPERSTÜCK, OF BERLIN-FRIEDENAU, GERMANY

POURING AND CLOSING LID FOR MILK TINS

Application filed January 3, 1930, Serial No. 418,346, and in Germany December 6, 1928.

This invention relates to a cover formed of two mutually oscillatable parts with spout and handle which, on being pressed onto a milk tin, converts same into a milk jug in such a manner that on turning the lid parts into mutually different positions, as required, the milk can be poured out of the tin or the tin can be airtightly closed, thereby preventing the milk going bad, clogging of the holes and the access of insects.

The invention also relates to a special construction of the connection of the two lid parts so that these parts can be easily dissembled enabling the parts to be cleaned separately at any time.

An embodiment of the invention is illustrated by way of example in the accompanying drawings in which:

Fig. 1 is a longitudinal section through the assembled lid parts.

Fig. 2 is a top plan view of the lower part of the lid.

Fig. 3 is a top plan view of the assembled lid.

Fig. 4 is a cross section through the top part of the lid.

Fig. 5 is a cross section through the lower part of the lid.

Fig. 6 is a cross section through the pivot pin in position in the lid.

Fig. 7 is a plan view of Fig. 6 seen from underneath.

Fig. 8 shows the position of the pin in the lower lid, when the connection is being disengaged.

An upper lid 1 and a lower lid 2 are connected with one another by means of a central pin 3 riveted on the upper lid 1. In the lower lid 2 (Fig. 1) a tubular pin 4 is fitted for pouring and a second tubular pin 5 for air supply. These tubular pins are milled to form a long and a short point, which points penetrate through the head of the milk tin, when the lid is pressed with a light pressure onto the tin. The two points are also designed to cause the pins to cut circular holes and the material of the tin to lie tightly against the pins and to prevent the cut out parts from falling into the milk tin as same remain suspended at the side of the unequal milled portion. A rubber ring may also be slipped over the pins 4 and 5, in order to form an absolute tight connection between the lid and the milk tin. The edge 6 of the lower lid is stamped out to form four parts so that the projections thus formed bear resiliently around the milk tin and in conjunction with the pouring and air feed tubes 4, 5 rigidly connect the pressed on lid with the tin.

In the lower lid an arcuate slot 7 (Fig. 2) narrower towards the axis is arranged, through which the upper lid (Fig. 3) is connected with the lower lid by inserting the lower head 16 of the rivet pin 3 through the wide end of the slot 7 and turning the lid 2 through a quarter revolution.

On the upper lid 1 two closing plates 12 and 13 are arranged, which are each pressed down by a spring and, when the lid is open, are situated in holes 10 and 11 of the lower lid 2, whereby the lower and upper lid are rigidly held in the open position (Fig. 1), ready for pouring. By a quarter revolution in anti clockwise direction the plates yield resiliently and enter the top end openings 8 and 9 of the tubular pins 4 and 5, thereby airtightly closing the milk tin. The upper and lower lids are dissembled by turning the upper lid in open condition a few degrees towards the right so that the closing plates 12 and 13 leave the holes 10 and 11 in the lower lid 2. The upper lid 1 is then pulled back outwardly so that the pin 3 (Fig. 1) slides into the wider portion of the slot 7 until the upper lid 1 can be lifted off.

In order to facilitate the insertion and removal of the connecting pin in the slot 7, the pin 3 may be provided with a radial groove 17 (Figs. 6 to 8) and the slot 7 with an inwardly projecting tooth 18. When the upper lid is being pulled into the position shown in Fig. 7, the tooth 18 engages in the groove 17, whereupon, on the upper lid being further rotated, the parts positively roll one on the other until the lid parts 1 and 2 are connected together. The dissembling of the two lid parts 1 and 2 is effected by reversing this operation.

I claim:

1. A pouring and closing lid for milk tins, comprising in combination a lower lid, an upper lid rotatable in relation to said lower lid, two tubular pins on said lower lid having each a long and a short point with angular recessed cutting edges of different heights extending one on each side of and connecting said points adapted to penetrate into the milk tin and to partially sever and bend over the portion of the tin head within said tubular pins, a spout on said lower lid, and closing elements mounted on said upper lid adapted to close the openings of said tubular pins, said lid being adapted to be pressed onto a tin thereby enabling said tin to be used as a milk jug.

2. A pouring and closing lid for milk tins as specified in claim 1, comprising in combination with the upper lid the lower lid, and the tubular pins on said lower lid, plates arranged on said upper lid, and a spring bearing on each of said plates adapted on the rotation of said upper lid to engage in and close the openings of said tubular pins.

3. A pouring and closing lid for milk tins as specified in claim 1, comprising in combination an upper lid a lower lid having an arcuate slot enlarged at one end, a pin mounted in said upper lid, and a head on said pin adapted to engage laterally in said slot, and connect said upper lid and said lower lid so that they are rotatable and easily taken to pieces.

4. A pouring and closing lid for milk tins as specified in claim 1, comprising in combination with the upper lid and the lower lid having an arcuate slot, a tooth inwardly projecting from said slot, and a pin with longitudinal groove mounted in said upper lid adapted to engage with said tooth on the pulling and turning of said upper lid and to positively effect a disconnection of the pin connection.

In testimony whereof I affix my signature.

FRIEDRICH KLAPPERSTÜCK.